Jan. 8, 1952     L. J. CUNNINGHAM     2,582,011
TESTING APPARATUS
Filed Nov. 28, 1945     3 Sheets-Sheet 1
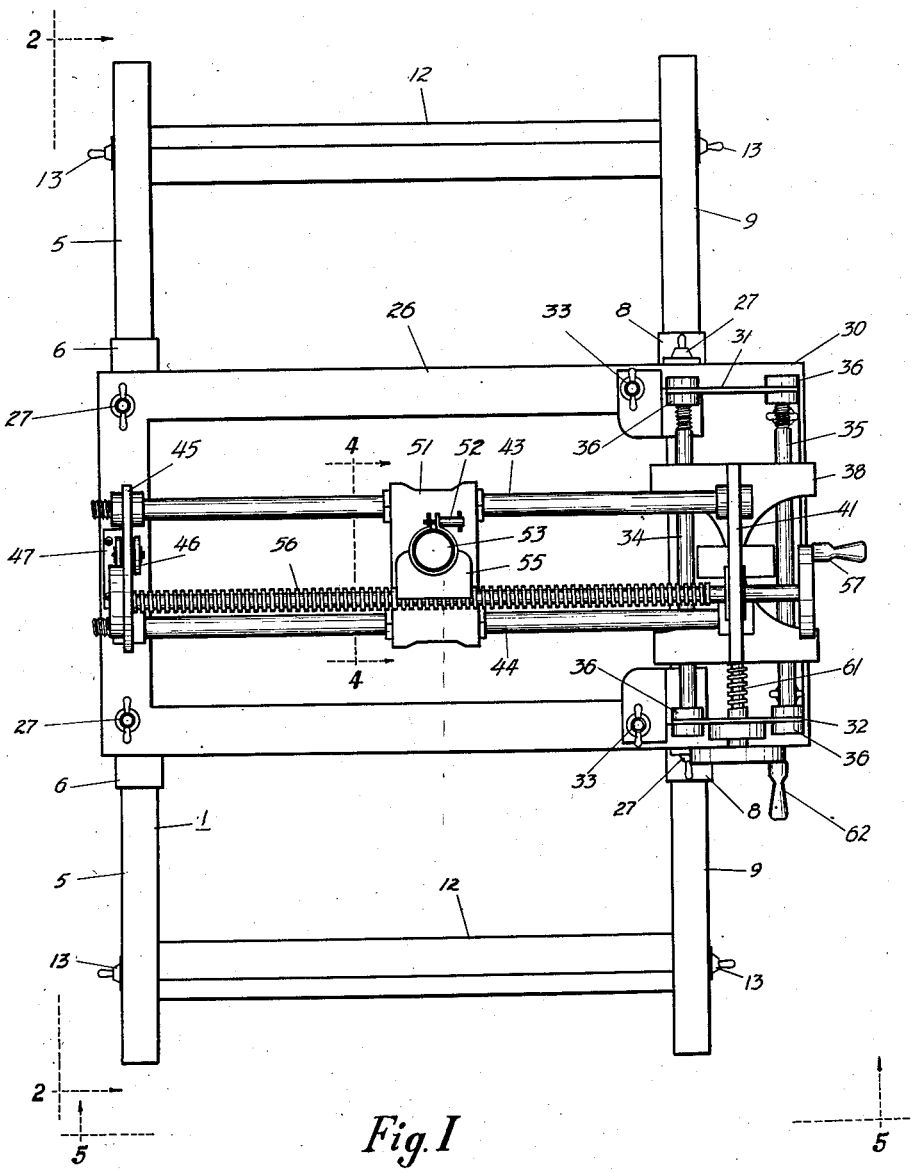
Fig. I
INVENTOR.
LEONARD J. CUNNINGHAM.
BY
Flournoy Corey Jan. 8, 1952     L. J. CUNNINGHAM     2,582,011
TESTING APPARATUS
Filed Nov. 28, 1945     3 Sheets-Sheet 2

INVENTOR.
LEONARD J. CUNNINGHAM.
BY
Flournoy Corey

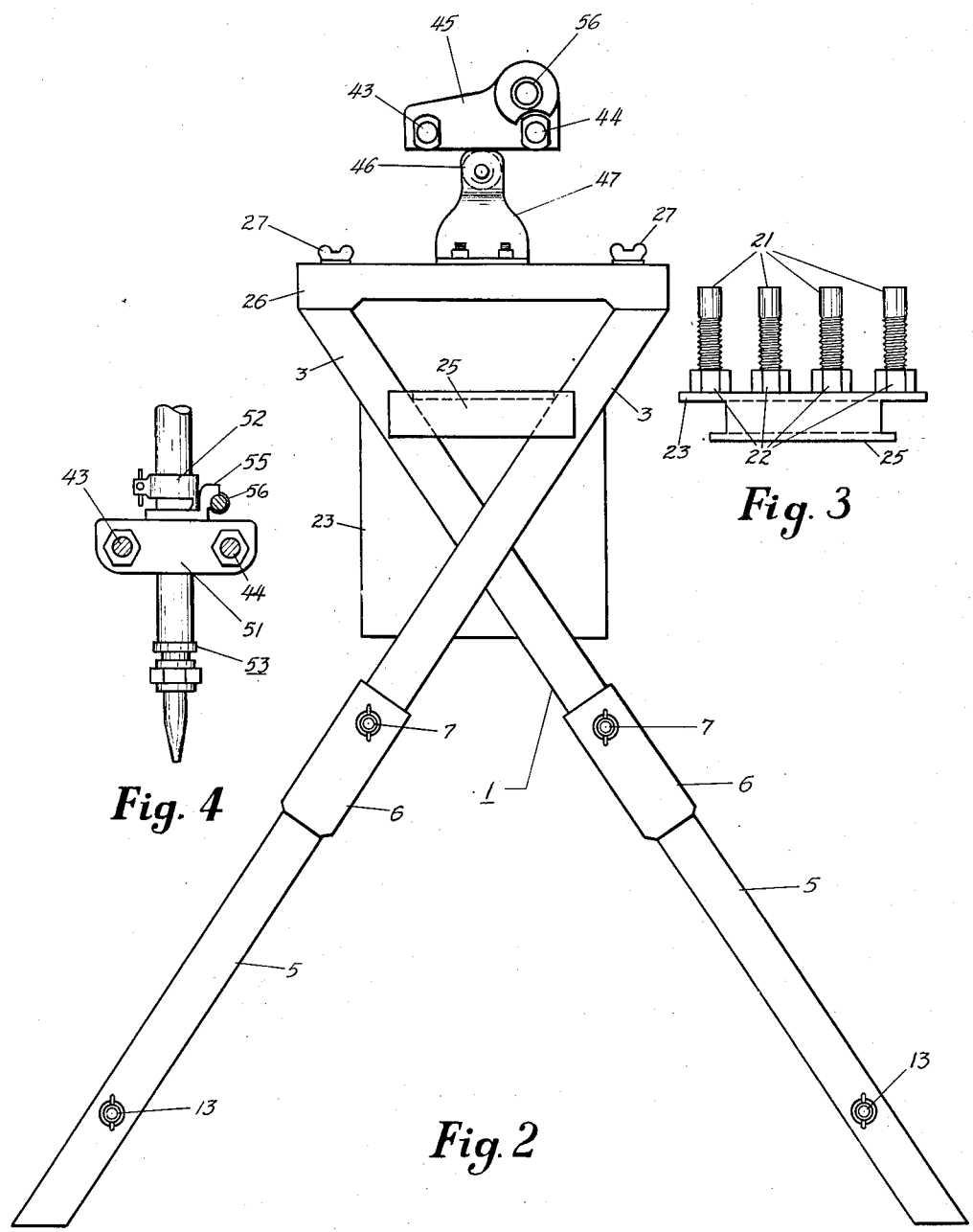

Patented Jan. 8, 1952

2,582,011

UNITED STATES PATENT OFFICE 2,582,011

TESTING APPARATUS

Leonard J. Cunningham, Lincoln, Nebr.

Application November 28, 1945, Serial No. 631,265

2 Claims. (Cl. 29—288)

The present invention relates generally to testing apparatus and is more particularly concerned with apparatus for testing welds.

When it is desired to test the qualifications of welders, it is customary to have them weld two pieces of pipe together in endwise relation and then cut specimens from the welded pipe, across the line of weld, and then subject such test pieces to tensile stresses, as in a hydraulic tensile testing machine, until the piece fails, either at the weld or in the pipe. The object and general nature of the present invention is the provision of a machine particularly adapted to receive such a welded pipe and to cut a plurality of specimens or test pieces, usually called coupons or straps, therefrom, such test pieces extending across the line of weld.

A further distinctive feature of this invention is the provision of a machine in which the specimens may be cut therein very rapidly and expeditiously, and a further feature is the provision of such a machine in which the welded pipe, or sample of weld is readily handled when removing the weld specimen and also when shifting the same when cutting a plurality of specimens therefrom.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a top or plan view of one form of my invention.

Figure 2 is a side view taken along the line 2—2 of Figure 1.

Figure 3 is a view of one of the sample holders, corresponding to a view thereof taken along the line 3—3 of Figure 5.

Figures 4 is a section taken along the line 4—4 of Figure 1.

Figure 5:
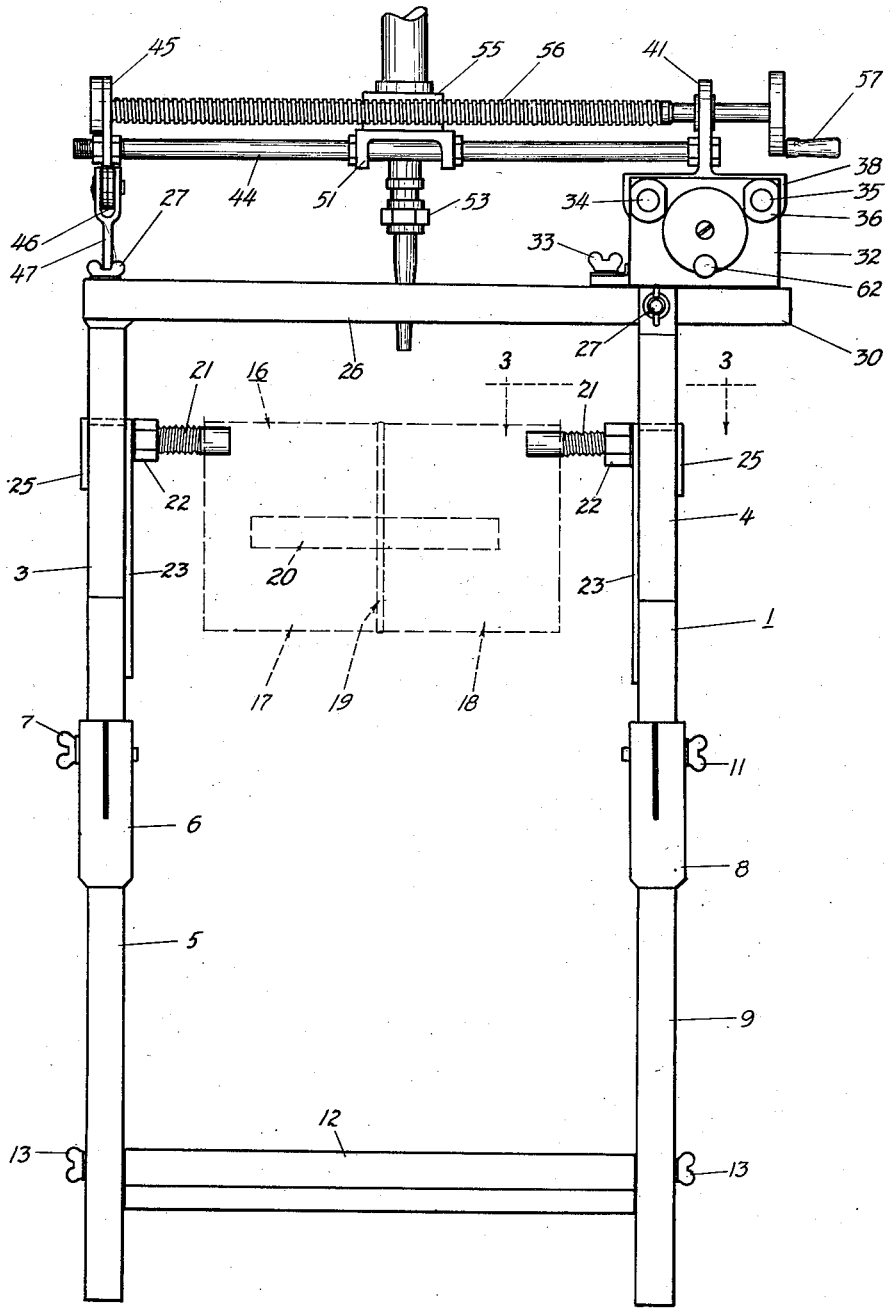
Figure 5 is a side view taken along the line 5—5 of Figure 1.

Referring now to the drawings, and particularly to Figures 1, 2 and 5; the main frame of the device is indicated at 1 and comprises a stand made up of an upper pair of right and left hand legs 3, 3 and 4, 4 assembled together in crossed relation as best shown in Figure 2. The lower ends of the legs 3 are adapted to be received in the sockets 6 which are fixed, as by welding, to the upper ends of a pair of lower legs 5, 5. The sockets 6 are provided with set screws 7 by means of which the two leg sections are rigidly connected together. The other legs 4 are adapted to be received in the sockets 8 fixed, as by welding, to the upper end of lower legs 9, and the sockets carry set screws 11, or the equivalent. The two lower legs sections 5, 5 and 9, 9 are fastened together by detachable braces 12 secured in place by set screws or bolts 13. This construction provides a sturdy support, but which may, however, be readily disassembled to be placed in a small compact package for transport or the like.

Reference was made above to the fact that the qualifications of welders may be determined by having the welder weld two pieces of pipe together endwise, and then cutting straps or test specimens therefrom, across the weld, and testing the same in tension.

Such a test pipe sample is shown in dotted lines in Figure 5 and indicated by the reference numeral 16, the two pipe sections being indicated at 17 and 18 and the line of weld at 19. A speciment to be cut therefrom is indicated at 20. However, it is to be understood that this specimen is not illustrated in the correct position for cutting. For supporting such a sample, as at 16, I provide a plurality of work-receiving and supporting pegs 21 which preferably are in the form of screw-threaded studs received by nuts 22 welded or otherwise fastened to a plate 23. As best shown at Figure 5, there is a plate 23 at each side of the machine, and each is fastened to the legs 3 and 4 by any suitable means, as by hook-like extensions 25 which overhang the crossed portions of the legs 3 and 4. A greater or lesser number of studs or pegs 21 may be used as required or desired.

The relatively large plates 23 add stability, since gravity and friction alone retain these hooked work-supporting members in position. These plates also serve to maintain the work-supporting pegs 21 in positions perpendicular to the legs 1. It will be noted, however, that these work-supporting members are free to be tilted to a limited degree, forward or back, that is, in the plane of the plate 23. Thus, one or both work-support plates may be tilted, when necessary, to firmly support an "out of round" pipe or other odd shaped piece of material from which a weld sample is to be cut.

A frame 26 is detachably carried at the upper ends of the legs 3 and 4, being fastened thereto by screws 27 or other suitable means. The frame 26 overhangs the upper end of the stand or support at one side, as shown at 30. This extended part of the frame 26 carries a pair of upstanding brackets 31 and 32 secured to said frame by means such as the thumb screws 33, and in these brackets a pair of guide rods 34 and 35 are mounted on suitable members 36, which may be in the form of lock nuts.

A carriage 38 is movable along the guide rods 34 and 35, the latter being spaced apart a sufficient distance so that the carriage is constrained for linear movement only. A relatively heavy bracket 41 is formed on or carried by the carriage 38 and receives one end of each of a pair of transverse guide rods 43 and 44, the other ends of which are received in a cross plate 45 which rides on a roller 46 carried on the upper end of a bracket 47 on the end of the frame 26. A second carriage 51 is slidably mounted on the guide rods 43 and 44 and has clamp means 52 which is adapted to secure a cutting torch, which I have indicated generally at 53, to the carriage or head 51. The cutting torch is of conventional construction and, generically, represents any suitable tool, or other means, for performing work on a workpiece. A half nut 55 is carried on the carriage 51 and meshes with a rotatable transverse screw 56 journaled for rotation in the brackets 41 and 45, one end thereof extending beyond the bracket 41 and having a handle 57, by which the screw 56 may be rotated to shift the carriage 51 and the torch 53 transversely of the work 16.

The bracket 32 on the frame extension 30 carries one end of a rotatable screw 61, the other end of which is received in a tapped opening in the carriage 38. The outer end of the screw 61 has an operating handle 62 by means of which the screw 61 may be rotated to shift the carriage 38 lengthwise of its guide rods 34 and 35 and thereby move the carriage 51 across the frame 26, as best shown in Figure 1.

In operation, the weld sample 16 is hung on the pegs 21, the torch 53 ignited and passed back and forth, and across, by turning the handles 57 and 62, to cut specimens from the welded pipe sections 16. One such specimen is indicated at 20 in Figure 5.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a device of the character described, a supporting stand and work supporting structure comprising a pair of crossed legs, means demountably securing said legs in spaced relation, plate-like members having means for supporting them against the inner, adjacent sides of the crossed legs, said supporting means comprising outwardly extending, hook-like projections engageable over the crossed portions of the legs, and a plurality of transversely arranged, work-supporting studs threadedly and removably mounted on the said plate-like members and extending horizontally inwardly therefrom.

2. In a device of the character described having a pair of spaced, crossed legs, means for supporting workpieces between the legs comprising plate-like members disposed against the inner surfaces of the crossed legs and having hook-like projections extending outwardly between the legs above the crossed portions thereof, and a plurality of transversely aligned studs extending inwardly from the said plate-like members and threadedly attached thereto.

LEONARD J. CUNNINGHAM.

REFERENCES CITED

The following references are of record in the file of this patent:

UNITED STATES PATENTS

| Number | Name | Date |
|---|---|---|
| 523,343 | Habernacker | July 24, 1894 |
| 860,883 | Polson | July 23, 1907 |
| 1,176,584 | Madgett | Mar. 21, 1916 |
| 1,415,968 | Wilson | May 16, 1922 |
| 1,441,913 | Darling | Jan. 9, 1923 |
| 1,552,585 | Guilfoyle et al. | Jan. 13, 1925 |
| 1,696,916 | Kutscheid | Jan. 1, 1929 |
| 1,804,271 | Palmer | May 5, 1931 |
| 1,963,537 | Tweit | June 19, 1934 |
| 2,391,008 | Bucko | Dec. 18, 1945 |
| 2,431,101 | Woods | Nov. 18, 1947 |

FOREIGN PATENTS

| Number | Country | Date |
|---|---|---|
| 10,703 of 1927 | Australia | July 10, 1928 |